US012664298B2

(12) United States Patent
Scriffignano et al.

(10) Patent No.: US 12,664,298 B2
(45) Date of Patent: Jun. 23, 2026

(54) SYSTEM AND METHOD FOR DISCOVERY AND ATTRIBUTION OF CRITICAL ECOSYSTEM MULTIPLE COUNTERPARTY BEHAVIORS TO ENABLE DISCOVERY

(71) Applicant: THE DUN AND BRADSTREET CORPORATION, Jacksonville, FL (US)

(72) Inventors: Anthony Scriffignano, West Caldwell, NJ (US); Ilya Meyzin, New Providence, NJ (US); Kamel Belkacem-Boussaid, Holmdel, NJ (US); Yan Vtorov, Livingston, NJ (US); Seyed Mohammad Nikouei, Hoboken, NJ (US); David A. Spingarn, Randolph, NJ (US); Jason Cawley, Anthem, AZ (US); Marco Guidetti, Castel Maggiore (IT); Philippa Cammack, Cupar (GB)

(73) Assignee: The Dun and Bradstreet Corporation, Jacksonville, FL (US)

( * ) Notice: Subject to any disclaimer, the term of this patent is extended or adjusted under 35 U.S.C. 154(b) by 99 days.

(21) Appl. No.: 18/799,271

(22) Filed: Aug. 9, 2024

(65) Prior Publication Data
US 2025/0061220 A1 Feb. 20, 2025

Related U.S. Application Data

(60) Provisional application No. 63/532,789, filed on Aug. 15, 2023.

(51) Int. Cl.
G06F 21/62 (2013.01)
G06F 21/64 (2013.01)

(52) U.S. Cl.
CPC .......... *G06F 21/6218* (2013.01); *G06F 21/64* (2013.01)

(58) Field of Classification Search
CPC ............................ G06F 21/6218; G06F 21/64
See application file for complete search history.

(56) References Cited

U.S. PATENT DOCUMENTS

| | | | | |
|---|---|---|---|---|
| 10,289,555 | B1 * | 5/2019 | Michaud | G06F 12/109 |
| 11,386,096 | B2 * | 7/2022 | Malik | G06F 16/367 |
| 2016/0156482 | A1 * | 6/2016 | Ichijo | G08C 17/02 |
| | | | | 709/204 |
| 2019/0057373 | A1 * | 2/2019 | Van Veelen | G06Q 20/00 |
| 2019/0278777 | A1 * | 9/2019 | Malik | G06F 16/9024 |

* cited by examiner

*Primary Examiner* — J. Brant Murphy
(74) *Attorney, Agent, or Firm* — Ohlandt, Greeley and Perle, LLP.

(57) ABSTRACT

An empirically rigorous system and method for establishing a digital fingerprint of a pattern of behavior and then prosecuting any ecosystem (either the one in which that pattern was found or a completely disparate one) for isomorphic relationships that resemble that pattern of behavior in a meaningful and quantifiable way. The method also addresses concerns of bias including random discovery, anecdotal similarity, and computational intractability. Applications include the discovery of patterns indicative of money laundering, fraud, and malfeasance.

27 Claims, 8 Drawing Sheets

Stochastic Sampling Method "DirectedWalks"

10

"Find-More-Like-This"

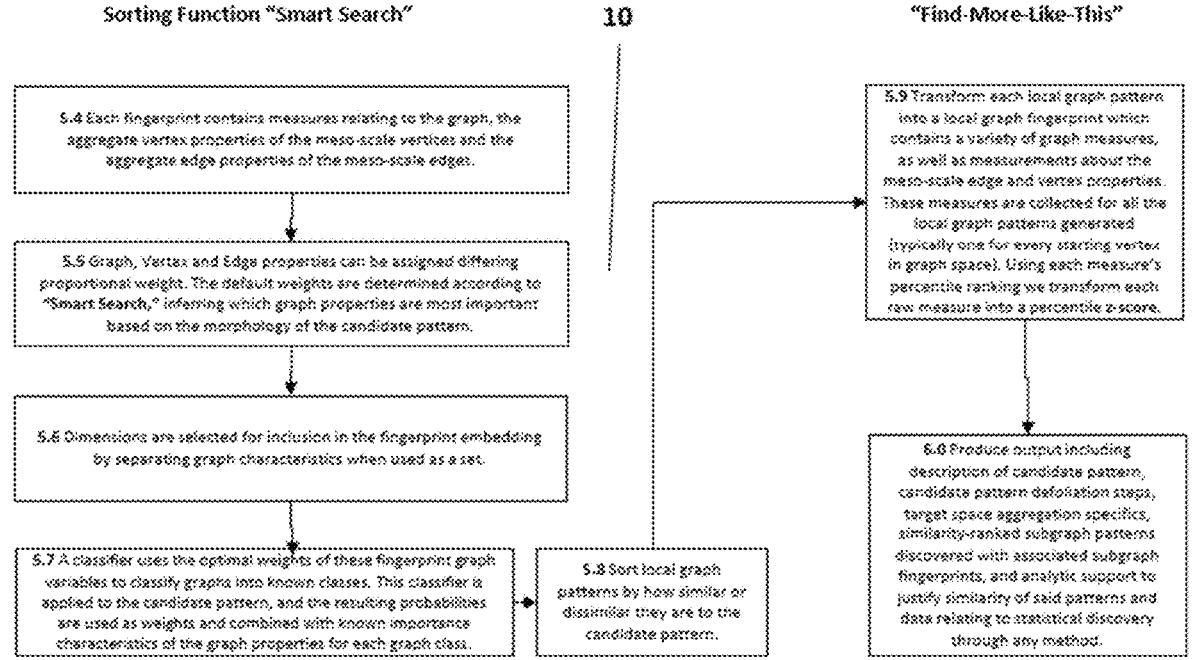

Sorting Function "Smart Search"    10    "Find-More-Like-This"

5.4 Each fingerprint contains measures relating to the graph, the aggregate vertex properties of the meso-scale vertices and the aggregate edge properties of the meso-scale edges.

5.5 Graph, Vertex and Edge properties can be assigned differing proportional weight. The default weights are determined according to "Smart Search," inferring which graph properties are most important based on the morphology of the candidate pattern.

5.6 Dimensions are selected for inclusion in the fingerprint embedding by separating graph characteristics when used as a set.

5.7 A classifier uses the optimal weights of these fingerprint graph variables to classify graphs into known classes. This classifier is applied to the candidate pattern, and the resulting probabilities are used as weights and combined with known importance characteristics of the graph properties for each graph class.

5.8 Sort local graph patterns by how similar or dissimilar they are to the candidate pattern.

5.9 Transform each local graph pattern into a local graph fingerprint which contains a variety of graph measures, as well as measurements about the meso-scale edge and vertex properties. These measures are collected for all the local graph patterns generated (typically one for every starting vertex in graph space). Using each measure's percentile ranking we transform each raw measure into a percentile z-score.

6.0 Produce output including description of candidate pattern, candidate pattern defoliation steps, target space aggregation specifics, similarity-ranked subgraph patterns discovered with associated subgraph fingerprints, and analytic support to justify similarity of said patterns and data relating to statistical discovery through any method.

FIG. 5

Relationship of interest    ⟋800

Out[43]=

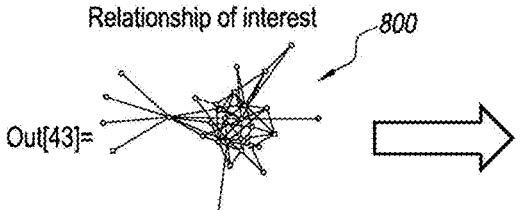

Subgraph behavior depicting
malfeasance pattern (e.g., a
single node connecting a clique
of otherwise disconnected
entities which exhibits some
impact on the remaining clique
in the connected component)

Digital "fingerprint" of relationship

| Characteristic 1 | Characteristic 2 | Characteristic 3 | ... | Characteristic n |
|---|---|---|---|---|
| 1.005 | 247.1 | -142.1 | . . . | A |

⟋802a  ⟋802b  ⟋802c  ⟋802d  ⟋802n

Set of derived characteristics relating to the
morphology, size, complexity, or other
classification of the subgraph.

FIG. 8

SYSTEM AND METHOD FOR DISCOVERY AND ATTRIBUTION OF CRITICAL ECOSYSTEM MULTIPLE COUNTERPARTY BEHAVIORS TO ENABLE DISCOVERY

CROSS REFERENCE TO RELATED APPLICATION

The present application claims the benefit under 35 U.S.C. § 119 of U.S. Provisional Patent Application No. 63/532,789, filed on Aug. 15, 2023, the contents of which are incorporated herein by reference.

BACKGROUND OF THE DISCLOSURE

1. Field of the Disclosure

The present disclosure relates to a way to characterize and detect specific relationship patterns larger than single entities and to scan large relationship graphs for the most similar local patterns and behaviors. More particularly, it relates to a system and method for establishing a digital fingerprint of a pattern of behavior and then prosecuting any ecosystem for isomorphic relationships that resemble that pattern of behavior in a meaningful and quantifiable way. Further, the method also addresses concerns of bias including but not limited to random discovery, anecdotal similarity, and computational intractability.

2. Description of the Related Art

Conventional techniques with respect to ecosystems centers on understanding the characteristic of counterparties or the nature of simple measures of interaction (e.g., supply chain analysis, which focuses on understanding all vendors of an enterprise with respect to demographics and propensities or understanding the character and quality of interaction with any of those counterparties).

There exist systems which attempt to characterize the ecosystem as a whole and focus on graph properties, visualizations, and other aspects of understanding morphology and context. Existing prior art can be clustered into two groups of solutions: graph curation and visualization software that connects entities given pre-established relationships, and graph interrogation software capable of using basic and widely understood graph measures (e.g., betweenness centrality, vertex count) to deliver insights on specific entities, including visualizations and computational parameters. Previous pattern finding methods for subgraphs of large relationship graphs have generally focused only on finding exact matches, which are rare in empirical relationship data. In all but trivial ecosystems, it is impossible for humans to reliably observe all ecosystem components at a close enough scale to perceive all significant patterns, let alone to scan large graphs for similar subgraphs. Additionally, different humans attempting to do the same thing would not produce the same observations, thus severely limiting the extensibility of the method. It is also impossible for human raters to compare/contrast different components detected.

There is a need for a way to characterize and detect specific relationship patterns larger than single entities and to scan large relationship graphs for the most similar local patterns and behaviors. The only way to do this with the prior art is with manual inspection or trivial attribution of naive subgraph properties, which is easily overwhelmed in complex or highly dynamic systems or produces significant issues with precision contrasted with recall.

SUMMARY OF THE DISCLOSURE

In general, an embodiment of the disclosure is directed to a system and method for establishing a digital fingerprint of a pattern of behavior and then prosecuting any ecosystem (either the one in which that pattern was found or a completely disparate one) for isomorphic relationships that resemble that pattern of behavior in a meaningful and quantifiable way. Further, the method also addresses concerns of bias including but not limited to random discovery, anecdotal similarity, and computational intractability.

The system and method are qualitatively different from the prior art in that they significantly build upon it by using bespoke individual measures that are taken to address the computational intractability of working with large graphs and other dyadic relationships. This can be done by computing and traversing in the context of mesoscale constructs and bespoke traversal methodologies. Combinations of pre-existing and newly developed analytics allow for the construction of subgraph fingerprints which enable defoliation and other methods to reduce the complexity while preserving the critical signal that comprises the essence of the relationship. Information gleaned from the traversal methods and curation modalities is summarized in a way that changes the behavior of human analysts and experts from opportunistic to highly directed thus producing results that were impossible to produce with the prior art. These summaries also enable behaviors that are qualitatively different from anything that was possible with the prior art in certain cases (e.g., when massive amounts of noise overwhelm a very small and changing number of signals).

The user can reliably observe all ecosystem components at a close enough scale to perceive all significant patterns and scan large graphs for similar subgraphs. The major advantages include scale, reproducibility of observation, ability to quantify/qualify attribution, and enabling future methods, particularly unsupervised AI.

An embodiment of the disclosure is directed to a system and method for ingesting and defoliating a pattern of dyadic relationships and assigning a fingerprint which comprises pre-existing and bespoke measurements and characteristics; curating a target space including the dimension of time that is constructed according to canonical grammars, allowing for discovery and synthesis of patterns which bear resemblance in some cases isomorphically to the original relationship; and presenting these patterns that have been discovered along with supporting statistical data to allow a group of trained experts to prosecute the discovered patterns in a way that would have overwhelmed even the largest possible collection of humans prior to the creation of this method due to the rate of change of information, interrater bias, the complexity of the underlying problem and other issues including veracity and adversarial manipulation of data.

An embodiment of the disclosure is directed to a system for characterizing and detecting specific relationship patterns and scanning large relationship graphs seeking similar patterns of behaviors, said system comprising: a computer processor; a memory for storing a set of instructions for the computer processor; a plurality of databases, accessible by said processor, including at least a database of behavior patterns, a database of candidate entities, a database of target space entities describing a target space ecosystem of participants, a database of target space traversal modalities selectors, and a database of dyadic relationships, wherein the set of instructions in the memory cause the computer processor to perform steps of: collecting a subset list of candidate entities from said database of candidate entities, wherein said database of candidate entities are known to exhibit a pattern of behavior; constructing a digital fingerprint grammar of a candidate pattern of behavior from said subset list of candidate entities using canonical dyadic relationships for establishing a candidate relationship digital fingerprint; defoliating said candidate relationship digital fingerprint to generate a defoliated candidate relationship digital fingerprint; collecting a subset list of target space entities describing a target space ecosystem from said database of target space entities describing a target space ecosystem of participants, wherein said database of target space entities are known to exhibit said pattern of behavior; constructing a target space grammar using said canonical dyadic relationships; constructing a target space from said target space grammar for a period of time; and utilizing said defoliated candidate relationship digital fingerprint within said target space during said period of time, to discover entities exhibiting similar patterns of behaviors from navigating said target space.

An embodiment of the disclosure is directed to said system further comprising: selecting a target space traversal modality selector from said database of target space traversal modalities selectors to utilize said defoliated candidate relationship digital fingerprint to navigate said target space for a known pattern of behavior; traversing said target space by using said target space traversal modality selector for said period of time to navigate said target space for said known pattern of behavior; recursively processing said step (ii) until exit condition(s) are met, thereby identifying a set of subgraph components in said target space which most closely resemble key aspects of said defoliated candidate relationship digital fingerprint; and producing an output data of entities exhibiting similar patterns of behaviors from navigating said target space, which most closely resemble important attributes of said defoliated candidate relationship digital fingerprint from step (iii).

An embodiment of the disclosure is directed to a system for prosecuting any ecosystem for isomorphic relationships that resemble a pattern of behavior in a quantifiable way, said system comprising: a computer processor; a memory for storing a set of instructions for the computer processor; a plurality of databases, accessible by said processor, including at least a database of behavior patterns, a database of candidate entities, a database of target space entities describing a target space ecosystem of participants, a database of target space traversal modalities selectors, and a database of dyadic relationships, wherein the set of instructions in the memory cause the computer processor to perform steps of: collecting a subset list of candidate entities from said database of candidate entities, wherein said database of candidate entities are known to exhibit a pattern of behavior; constructing a digital fingerprint grammar of a candidate pattern of behavior from said subset list of candidate entities using canonical dyadic relationships for establishing a candidate relationship digital fingerprint; defoliating said candidate relationship digital fingerprint to generate a defoliated candidate relationship digital fingerprint; collecting a subset list of target space entities describing a target space ecosystem from said database of target space entities describing a target space ecosystem of participants, wherein said database of target space entities are known to exhibit said pattern of behavior; constructing a target space grammar using said canonical dyadic relationships; constructing a target space from said target space grammar for a period of time; and utilizing said defoliated candidate relationship digital fingerprint within said target space during said period of time, to discover entities exhibiting similar patterns of behaviors from navigating said target space.

An embodiment of the disclosure is directed to said system further comprising: selecting a target space traversal modality selector from said database of target space traversal modalities selectors to utilize said defoliated candidate relationship digital fingerprint to navigate said target space for a known pattern of behavior; traversing said target space by using said target space traversal modality selector for said period of time to navigate said target space for said known pattern of behavior; recursively processing said step (ii) until exit condition(s) are met, thereby identifying a set of subgraph components in said target space which most closely resemble key aspects of said defoliated candidate relationship digital fingerprint; and producing an output data of entities exhibiting similar patterns of behaviors from navigating said target space, which most closely resemble important attributes of said defoliated candidate relationship digital fingerprint from step (iii).

An embodiment of the disclosure is directed to a method for characterizing and detecting specific relationship patterns and scanning large relationship graphs seeking similar patterns of behaviors, said method comprising: collecting a subset list of candidate entities from said database of candidate entities, wherein said database of candidate entities are known to exhibit a pattern of behavior; constructing a digital fingerprint grammar of a candidate pattern of behavior from said subset list of candidate entities using canonical dyadic relationships for establishing a candidate relationship digital fingerprint; defoliating said candidate relationship digital fingerprint to generate a defoliated candidate relationship digital fingerprint; collecting a subset list of target space entities describing a target space ecosystem from said database of target space entities describing a target space ecosystem of participants, wherein said database of target space entities are known to exhibit said pattern of behavior; constructing a target space grammar using said canonical dyadic relationships; constructing a target space from said target space grammar for a period of time; and utilizing said defoliated candidate relationship digital fingerprint within said target space during said period of time, to discover entities exhibiting similar patterns of behaviors from navigating said target space.

An embodiment of the disclosure is directed to said method further comprising: selecting a target space traversal modality selector from said database of target space traversal modalities selectors to utilize said defoliated candidate relationship digital fingerprint to navigate said target space for a known pattern of behavior; traversing said target space by using said target space traversal modality selector for said period of time to navigate said target space for said known pattern of behavior; recursively processing said step (ii) until exit condition(s) are met, thereby identifying a set of subgraph components in said target space which most closely resemble key aspects of said defoliated candidate relationship digital fingerprint; and producing an output data of entities exhibiting similar patterns of behaviors from navigating said target space, which most closely resemble important attributes of said defoliated candidate relationship digital fingerprint from step (iii).

An embodiment of the disclosure is directed to a method for prosecuting any ecosystem for isomorphic relationships that resemble a pattern of behavior in a quantifiable way, said method comprising: collecting a subset list of candidate entities from said database of candidate entities, wherein said database of candidate entities are known to exhibit a pattern of behavior; constructing a digital fingerprint grammar of a candidate pattern of behavior from said subset list of candidate entities using canonical dyadic relationships for establishing a candidate relationship digital fingerprint; defoliating said candidate relationship digital fingerprint to generate a defoliated candidate relationship digital fingerprint; collecting a subset list of target space entities describing a target space ecosystem from said database of target space entities describing a target space ecosystem of participants, wherein said database of target space entities are known to exhibit said pattern of behavior; constructing a target space grammar using said canonical dyadic relationships; constructing a target space from said target space grammar for a period of time; and utilizing said defoliated candidate relationship digital fingerprint within said target space during said period of time, to discover entities exhibiting similar patterns of behaviors from navigating said target space.

An embodiment of the disclosure is directed to said method further comprising: selecting a target space traversal modality selector from said database of target space traversal modalities selectors to utilize said defoliated candidate relationship digital fingerprint to navigate said target space for a known pattern of behavior; traversing said target space by using said target space traversal modality selector for said period of time to navigate said target space for said known pattern of behavior; recursively processing said step (ii) until exit condition(s) are met, thereby identifying a set of subgraph components in said target space which most closely resemble key aspects of said defoliated candidate relationship digital fingerprint; and producing an output data of entities exhibiting similar patterns of behaviors from navigating said target space, which most closely resemble important attributes of said defoliated candidate relationship digital fingerprint from step (iii).

An embodiment of the disclosure is directed to a system for establishing a digital fingerprint of a pattern of behavior comprising: a computer processor; a memory for storing a set of instructions for the computer processor; a plurality of databases, accessible by said processor, including at least a database of behavior patterns, a database of candidate entities, a database of target space entities describing a target space ecosystem of participants, a database of target space traversal modalities selectors, and a database of dyadic relationships, wherein the set of instructions in the memory cause the computer processor to perform steps of: collecting a subset list of candidate entities from said database of candidate entities, wherein said database of candidate entities are known to exhibit a pattern of behavior; constructing a digital fingerprint grammar of a candidate pattern of behavior from said subset list of candidate entities using canonical dyadic relationships for establishing a candidate relationship digital fingerprint; defoliating said candidate relationship digital fingerprint to generate a defoliated candidate relationship digital fingerprint; collecting a subset list of target space entities describing a target space ecosystem from said database of target space entities describing a target space ecosystem of participants, wherein said database of target space entities are known to exhibit said pattern of behavior; constructing a target space grammar using said canonical dyadic relationships; constructing a target space from said target space grammar for a period of time; and utilizing said defoliated candidate relationship digital fingerprint within said target space during said period of time, to discover entities exhibiting similar patterns of behaviors from navigating said target space.

An embodiment of the disclosure is directed to said system further comprising: selecting a target space traversal modality selector from said database of target space traversal modalities selectors to utilize said defoliated candidate relationship digital fingerprint to navigate said target space for a known pattern of behavior; traversing said target space by using said target space traversal modality selector for said period of time to navigate said target space for said known pattern of behavior; recursively processing said step (ii) until exit condition(s) are met, thereby identifying a set of subgraph components in said target space which most closely resemble key aspects of said defoliated candidate relationship digital fingerprint; and producing an output data of entities exhibiting similar patterns of behaviors from navigating said target space, which most closely resemble important attributes of said defoliated candidate relationship digital fingerprint from step (iii).

Important features and details behind the method, FMLT ("Find-More-Like-This") capability are that FMLT uses the notion of "digital fingerprinting" for a local subgraph region within a larger network or relationship graph. This uses a multi-dimensional vector space embedding of numerous graph measures to characterize a local subgraph and to provide a "distance measure" of local graph similarity, which can then be used to scan a wider network for the closest approximations to an original pattern.

BRIEF DESCRIPTION OF THE DRAWINGS

FIG. 5 is a block diagram and flow chart of the sorting function, called Smart Search, utilized in FMLT capability according to the present disclosure.

FIG. 8 illustrates a typical digital fingerprint characteristic of malfeasance, as described herein.

A component or a feature that is common to more than one drawing is indicated with the same reference number in each of the drawings.

DETAILED DESCRIPTION OF THE PREFERRED EMBODIMENTS

Figure 1:
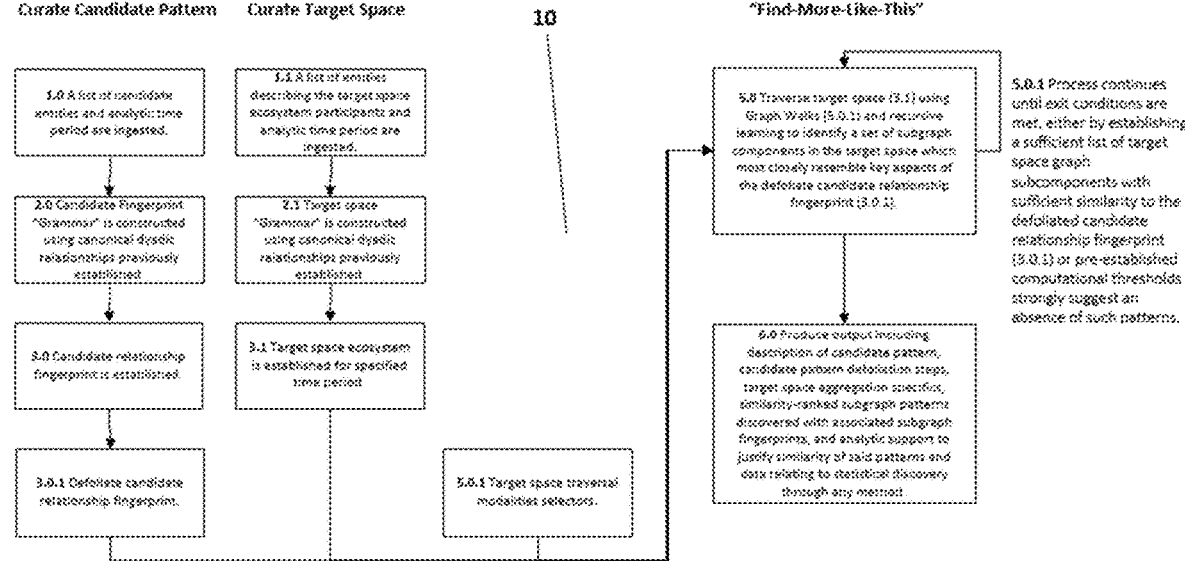
FIG. 1 is a block diagram and flow chart of the "Find-More-Like-This" (FMLT) capability according to the present disclosure.

In FIG. 1, a block diagram and flow chart of the "Find-More-Like-This" (FMLT) capability generally represented by reference numeral 10 is shown, according to the present disclosure. The "Find-More-Like-This" (FMLT) capability 10 begins curating a candidate pattern by ingesting a list of candidate entities and an analytic time period in step 1.0. After step 1.0 is completed, FMLT capability 10 constructs a candidate fingerprint "Grammar" using canonical dyadic relationships previously established in step 2.0. FMLT capability 10, then establishes a candidate relationship digital fingerprint in step 3.0. Further, FMLT capability 10 defoliates the candidate relationship digital fingerprint in step 3.0.1. As the curating of the candidate pattern begins, FMLT capability 10 is simultaneously curating a target space by ingesting a list of entities describing the target space ecosystem participants and an analytic time period in step 1.1. After step 1.1 is completed, FMLT capability 10 constructs a target space "Grammar" using canonical dyadic relationships previously established in step 2.1. FMLT capability 10, then establishes a target space ecosystem for a specified time period in step 3.1. After completing, curating a candidate pattern in step 3.0.1 and curating a target space in step 3.1, FMLT capability 10 utilizes target space traversal modalities selectors, called Graph Walks, in step 5.0.1. Further, in step 5.0, FMLT capability 10 traverses target space in step 3.1, using Graph Walks in step 5.0.1 and recursive learning to identify a set of subgraph components in the target space which most closely resemble key aspects of the defoliate candidate relationship digital fingerprint curated in step 3.0.1. In step 5.0.1, the process continues until exit conditions are met, either by establishing a sufficient list of target space graph subcomponents with sufficient similarity to the defoliated candidate relationship digital fingerprint curated in step 3.0.1, or pre-established computational thresholds strongly suggest an absence of such patterns. Thus, FMLT capability 10 then uses a sorting function, which produces output including a description of a candidate pattern, candidate pattern defoliation steps, target space aggregation specifics, similarity-ranked subgraph patterns discovered with associated subgraph fingerprints, and analytic support to justify similarity of said patterns and data relating to statistical discovery through any stochastic sampling method in step 6.0.

FMLT capability 10 uses the notion of "digital fingerprinting" for a local subgraph region within a larger network or relationship graph. This uses a multi-dimensional vector space embedding of numerous graph measures to characterize a local subgraph and to provide a "distance measure" of local graph similarity, which can then be used to scan a wider network for the closest approximations to an original pattern.

As used herein, fingerprinting is a proprietary set of algorithms used to distil a graph into a special vector whose different dimensions measure different characteristics of a graph. In general, fingerprinting is applied at the meso-scale, which is embodied by graphs containing at most a few hundred vertices and edges, varying down to regions just 2 or 3 edge lengths from an origin node. However, experience has shown that larger scales are not useful in the context of understanding clique behavior in the sorts of use cases intended for this capability. Further, the values calculated in the different dimensions of a fingerprint embedding fall into a few major categories. Thus, while some measures are calculable for an entire graph (i.e., full-graph measures), others start from a measure calculated at the vertex level (node measures) and produce distributions across a local graph, which can then be characterized by a few parameters to form the vector dimension measures. Fingerprint measures that are not counts are scale-free and attribute-agnostic: they quantify graph structures similarly for graphs of very different sizes.

After formulating a fingerprint embedding, stochastic sampling methods are used to construct an appropriate distance measure to utilize in comparing subgraphs in the embedded space, which acts as an index of local graph pattern similarity. This distance measure is tuned for desired characteristics such as, for example, the ability to discriminate graphs of known ideal characteristics, working well on known empirical datasets, not being dominated by a few embedding dimensions, and the like. As part of the tuning of this distance measure, development of the method conducts extensive stochastic sampling of both ideal and empirical graph datasets using graph walks. This portion of the method ensures that distance measures used in specific empirical tasks are appropriate for the datasets they are to operate within.

Fingerprinting the candidate pattern produces the target vector for similarity comparisons. To make these comparisons, it is necessary to construct graph representations of local graph regions in the target space and then fingerprint these meso-scale graphs to produce their vector representations. Building and fingerprinting meso-scale regions from large graphs is computationally intensive, so FMLT capability 10 employs stochastic sampling methods to reduce the computational load and time required. Two hyperparameter variables govern both of the simple stochastic sampling methods included in FMLT capability 10—the number of walks (NWalks) and the number of steps per walk (NSteps). Each variable performs differently for the two walk methods, Random Walks and DirectedWalks, as is discussed below. Insights from the repeated application of these methods on a wide variety of FMLT capability 10 problems resulted in the development of a third, dynamic technique called GuidedWalks.

Figure 2:
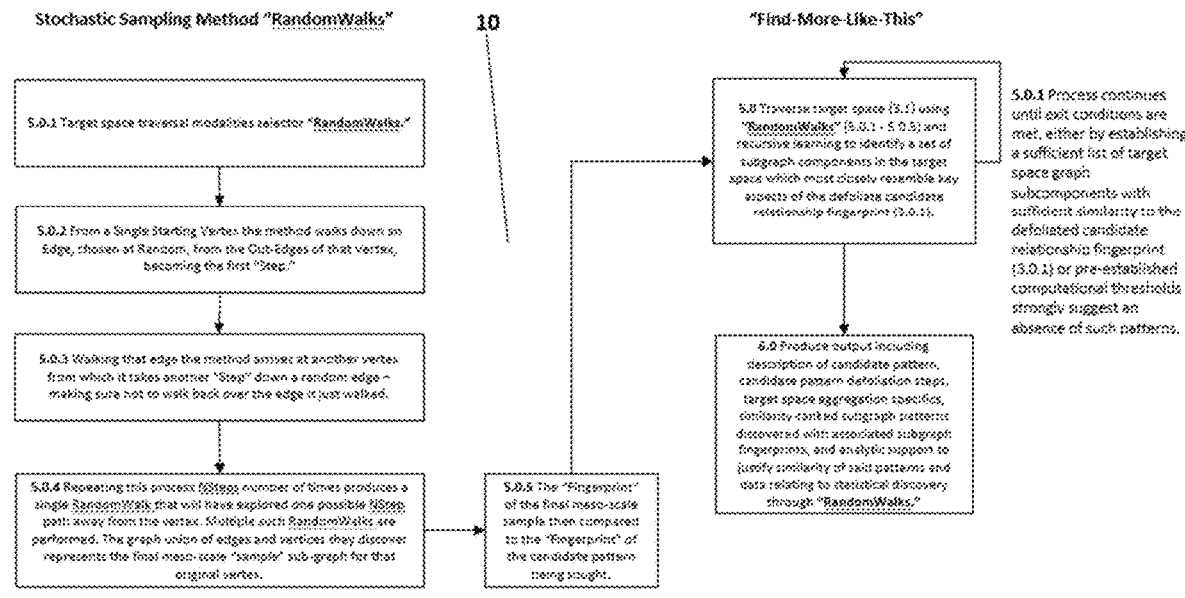
FIG. 2 is a block diagram and flow chart of a stochastic sampling method, called RandomWalks, utilized in FMLT capability according to the present disclosure.

In FIG. 2, a block diagram and flow chart of a stochastic sampling method, called RandomWalks, utilized in FMLT capability 10 is shown, according to the present disclosure. When the stochastic sampling method, known as RandomWalks, is chosen, it is used by FMLT capability 10 as a target space traversal modalities selector in step 5.0.1. In step 5.0.2, the RandomWalks method begins from a single starting vertex and walks down an Edge, chosen at Random, from the Out-Edges of that Vertex, becoming the first "Step." Walking that edge, the RandomWalks method arrives at another vertex from which it takes another "Step" down a random edge-making sure not to walk back over the edge it just walked in step 5.0.3. Further, in step 5.0.4, repeating this process NSteps number of times produces a single RandomWalk that will have explored one possible NStep path away from the vertex. Multiple such RandomWalks are performed. The graph union of edges and vertices they discover represents the final meso-scale "sample" subgraph for that original vertex. The RandomWalks method then compares the "Fingerprint" of the final meso-scale sample to the "Fingerprint" of the candidate pattern being sought in step 5.0.5. FMLT capability 10, then traverses target space in step 3.1 using the RandomWalks method in steps 5.0.1 through 5.0.5 and recursive learning to identify a set of subgraph components in the target space which most closely resemble key aspects of the defoliate candidate relationship digital fingerprint curated in step 3.0.1. In steps 5.0.1 through 5.0.5, the process continues until exit conditions are met, either by establishing a sufficient list of target space graph subcomponents with sufficient similarity to the defoliated candidate relationship digital fingerprint curated in step 3.0.1, or until pre-established computational thresholds strongly suggest an absence of such patterns. Thus, FMLT capability 10 then uses a sorting function, which produces output including a description of a candidate pattern, candidate pattern defoliation steps, target space aggregation specifics, similarity-ranked subgraph patterns discovered with associated subgraph fingerprints, and analytic support to justify similarity of said patterns and data relating to statistical discovery through the Random Walks method in step 6.0.

It is a computationally intensive task to find candidate matches to a given subgraph pattern in a large network graph. However, vector space embedding methods including graph fingerprinting utilize the stable nature of the embedding mapping to search for nearby points in the embedded space. This is used in conjunction with graph sampling methods, using the fact that a local sampled subgraph will have embedding measures not too far different from the fuller graph around a given node.

There are various methods employed to address the extreme size of constructed multidimensional dyadic relationships. These methods are intended to address not only the computational complexity of walking through such a very large space but also to address the realities of missingness, curation bias, and other factors inherent to the typical data corpora. The RandomWalk method for graph sampling starts at any vertex in the target space and chooses an edge to walk down, at random, from the out-edges of that vertex. This is the first "step". Walking that edge, the Random Walk arrives at another vertex from which it takes another "step" down a random edge-making sure not to walk back over the edge it just walked. Repeating this process NSteps number of times produces a single RandomWalk that will have explored one possible NStep path away from the vertex. To build out a representation of the local graph region around that vertex, multiple such RandomWalks are performed—the graph union of the edges and vertices they discover represents the final meso-scale "sample" sub-graph for that original vertex. The "fingerprint" of that meso-scale sample may then be compared to the fingerprint of the candidate pattern being sought.

Random Walks have the virtue of being computationally simpler and therefore significantly more useful with respect to tractability of the corpora in use. They do not (for the most part) suffer from computational explosion issues when walking from high-degree vertices. In general, the speed of the Random Walk does not depend on the connectivity of the underlying space they are exploring. The weakness of RandomWalks is that they can miss underlying structure and fail to recognize high out-degree or highly connected spaces (this consideration is mitigated through the use of multiple random walks).

The probability that a vertex N steps away from the starting vertex will be included in the RandomWalk falls off exponentially in proportion to the number of paths of less than or equal to length N away from the starting vertex. In general, this probability means that the area in the direct vicinity of the starting vertex will be relatively well-explored, while areas farther away from the starting vertex will appear artificially less connected. This method is well suited for large spaces where the target is unknown and the computational complexity of walking the entire space is realistically overwhelming (e.g., addressing polynomial non-determinism with respect to real-world deadlines).

Figure 3:
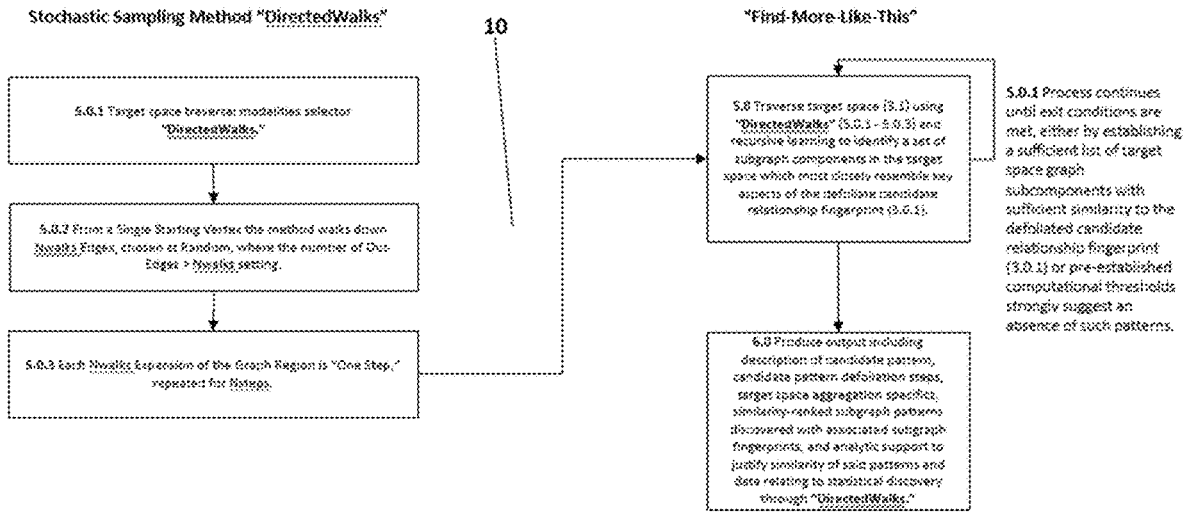
FIG. 3 is a block diagram and flow chart of a stochastic sampling method, called DirectedWalks, utilized in FMLT capability according to the present disclosure.

In FIG. 3, a block diagram and flow chart of a stochastic sampling method, called DirectedWalks, utilized in FMLT capability 10 is shown, according to the present disclosure. When the stochastic sampling method, known as Directed-Walks, is chosen, it is used by FMLT capability 10 as a target space traversal modalities selector in step 5.0.1. In step 5.0.2, the DirectedWalks method begins from a single starting vertex and walks down Nwalks Edges, chosen at random, where the number of Out-Edges is greater than the Nwalks setting. Further, each Nwalks Expansion of the Graph Region is "One Step," repeated for Nsteps in step 5.0.3. FMLT capability 10, then traverses target space in step 3.1 using the DirectedWalks method in steps 5.0.1 through 5.0.3 and recursive learning to identify a set of subgraph components in the target space which most closely resemble key aspects of the defoliate candidate relationship digital fingerprint curated in step 3.0.1. In steps 5.0.1 through 5.0.3, the process continues until exit conditions are met, either by establishing a sufficient list of target space graph subcomponents with sufficient similarity to the defoliated candidate relationship digital fingerprint curated in step 3.0.1, or pre-established computational thresholds strongly suggest an absence of such patterns. Thus, FMLT capability 10 then uses a sorting function, which produces output including a description of a candidate pattern, candidate pattern defoliation steps, target space aggregation specifics, similarity-ranked subgraph patterns discovered with associated subgraph fingerprints, and analytic support to justify similarity of said patterns and data relating to statistical discovery through the DirectedWalks method in step 6.0.

For a DirectedWalk, starting from a single vertex the method walks down NWalks edges, chosen at random in the case that the number of out-edges is higher than the NWalks setting. Each such NWalks expansion of the graph region is one step, and this process is repeated for NSteps. This approach has several key advantages with respect to completeness of traversal. First, for DirectedWalks there is a much lower likelihood of repeatedly sampling the same edge/vertex. The probability for an edge being sampled also falls off sub-linearly in most cases where the average out-degree in the region being sampled is not significantly higher than NWalks. Finally, if the out-degree of the vertex in question is less than or equal to the NWalks setting, a DirectedWalk will map the local graph region with deterministic fidelity. Only when a vertex has a very high out-degree will the NWalks parameters impact the exploration by limiting the number of edges to be explored from any given vertex.

DirectedWalks have a few weaknesses. The sampled spaces for a large NSteps and NWalks can grow very quickly in densely connected spaces-retrieving a theoretical maximum of $NSteps^NWalks$. This characteristic can make sampling slower, and result in fingerprints that are much larger than the candidate pattern being searched. It is also possible that in very well-connected spaces the DirectedWalks algorithm, restricted to only sampling NWalks edges from any vertex, will dramatically under-represent the true connectedness of a given region.

Figure 4:
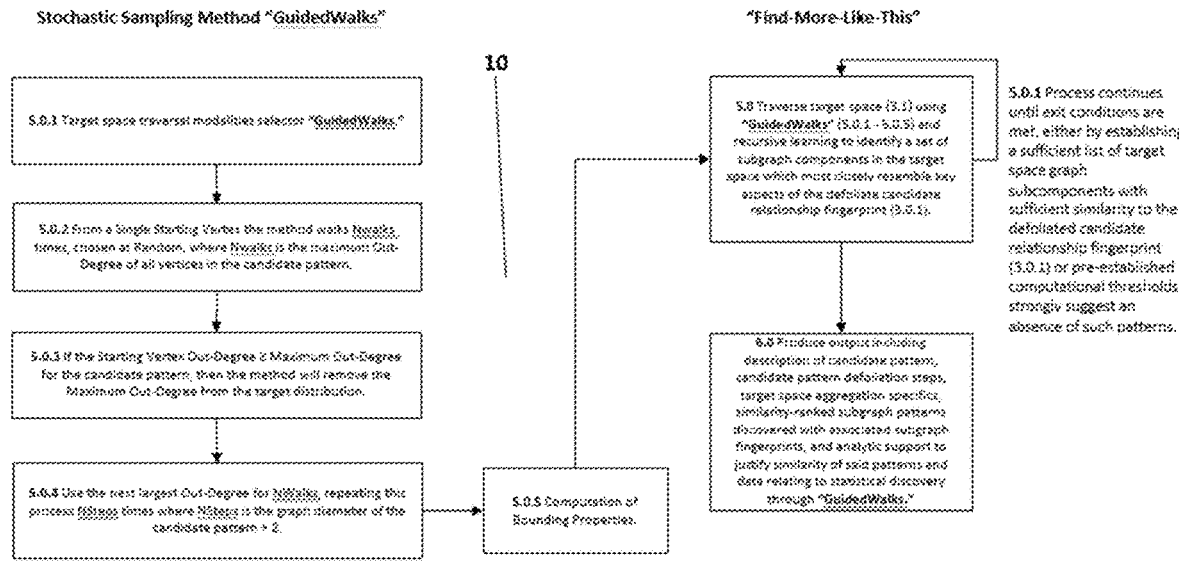
FIG. 4 is a block diagram and flow chart of a stochastic sampling method, called GuidedWalks, utilized in FMLT capability according to the present disclosure.

In FIG. 4, a block diagram and flow chart of a stochastic sampling method, called GuidedWalks, utilized in FMLT capability 10 is shown, according to the present disclosure. When the stochastic sampling method, known as Guided-Walks, is chosen, it is used by FMLT capability 10 as a target space traversal modalities selector in step 5.0.1. In step 5.0.2, the GuidedWalks method begins from a single starting vertex and walks Nwalks times, chosen at Random, where Nwalks is the maximum Out-Degree of all vertices in the candidate pattern. If the Starting Vertex Out-Degree is greater than or equal to the Maximum Out-Degree for the candidate pattern, then the method will remove the Maximum Out-Degree from the target distribution in step 5.0.3. Further, in step 5.0.4, the method continues by using the next largest Out-Degree for NWalks, repeating this process NSteps times where NSteps is the graph diameter of the candidate pattern+2. Thus, using the GuidedWalks method for any candidate pattern in a FMLT capability 10 search, it can compute bounding properties of that candidate in step

5.0.5. FMLT capability 10, then traverses target space in step 3.1 using the GuidedWalks method in steps 5.0.1 through 5.0.5 and recursive learning to identify a set of subgraph components in the target space which most closely resemble key aspects of the defoliate candidate relationship digital fingerprint curated in step 3.0.1. In steps 5.0.1 through 5.0.5, the process continues until exit conditions are met, either by establishing a sufficient list of target space graph subcomponents with sufficient similarity to the defoliated candidate relationship digital fingerprint curated in step 3.0.1, or pre-established computational thresholds strongly suggest an absence of such patterns. Thus, FMLT capability 10 then uses a sorting function, which produces output including a description of a candidate pattern, candidate pattern defoliation steps, target space aggregation specifics, similarity-ranked subgraph patterns discovered with associated subgraph fingerprints, and analytic support to justify similarity of said patterns and data relating to statistical discovery through the GuidedWalks method in step 6.0.

GuidedWalks use the graph diameter and vertex degree distribution of the candidate pattern and use these parameters dynamically as the basis for NWalks and NSteps. With a DirectedWalks style sampling, GuidedWalks will walk from the starting vertex NWalks times, where NWalks is chosen to be the maximum out-degree of all vertices in the candidate pattern. If the out-degree of the starting vertex is at least as large as the maximum out-degree for the candidate pattern, GuidedWalks will remove this maximum out-degree from the target distribution. The next steps taken will use the next largest out-degree for NWalks, repeating this process NSteps times where NSteps is the graph diameter of the candidate pattern+2 (this to account for a potential defoliation post-processing step that has the effect of reducing the diameter of the resulting sampled graphs).

All of these methods are used to tractably create subgraphs for fingerprint "measurement," which can in turn be compared to the fingerprint of an original candidate pattern, with the top "best matches" returned from the overall search.

For any candidate pattern in a FMLT search, it can compute bounding properties of that candidate (e.g., graph diameter). These bounding properties are the necessary conditions a GuidedWalk will need to meet at a minimum to map similar local graph regions to the candidate pattern. If below the thresholds of these bounding properties, then discovering patterns like the candidate pattern will be much less likely or impossible.

Graph diameter is the most obvious such bounding property. For either a DirectedWalk or RandomWalk, the number of steps taken defines the maximum diameter local graph pattern that can possibly be discovered. If the candidate pattern has a diameter of 7, for example, it is impossible for a stochastic sampling method to discover an isomorphic local graph pattern to the candidate, in the graph space, by taking less than 4 steps (each step can, in theory, result in an increase in a graph diameter of maximum of 2). Half of the graph diameter of the candidate pattern represents a theoretical minimum steps setting for the stochastic walks. When actually sampling from the graph space it is unknown where in the space the starting vertex is located—it is possible that the out-degree of the starting vertex is 1, or that the possible steps in any given direction are otherwise limited by the shape of the space or the available out-edges. Given this, the theoretical maximum number of steps required to map any candidate pattern of a diameter of 7 is 7.

Generalizing this process, stochastic sampling uses a steps configuration range between 0.5 to 1.0 times the candidate pattern diameter, which will at least potentially capture all candidate-like local graph patterns in a graph space.

A similar analysis can be performed in terms of the number of walks needed. Each walk has the potential of sampling some new out-edge from a given vertex. The maximum number of edges discoverable through any stochastic sampling technique is set by the number of walks used. As a first approximation, an inference is made that walks should be set to the maximum out-degree of any vertex in the candidate pattern. Whenever the number of walks is set below this threshold it becomes mathematically impossible to discover an isomorphic graph of the candidate pattern in a graph space.

The guided search computational features, including fast halting for isomorphic patterns ("direct hits"), candidate vertex out-degree targeting and defoliation decisions, can have important informational consequences. Any stochastic sampling method, by necessity, is ignoring some information about the underlying local graph region. By accounting for the edges not visited, GuidedWalks can effect confidence that the fingerprints created are not primarily the product of edge deletion and instead are pointing to real structure in the local region of the underlying graph space.

The GuidedWalk algorithm dynamically searches for suitable local graph structures in traversed space based on the characteristics of a candidate pattern. By initially constraining NSteps using a diameter of the candidate pattern, it can ensure that the pattern is mathematically discoverable in traversed space, if it exists. By automatically determining and reacting to the need for fingerprint defoliation, GuidedWalks avoid the noise created from dangling structures when searching for closed candidate patterns. Limiting NWalks dynamically during each random step allows the method to avoid over-sampling any particular region, or computationally exploding when encountering some high-degree vertex in the graph space. Finally, by halting additional steps when a minimum included edge fraction threshold is violated, GuidedWalks quickly identify graph space regions that require large amounts of edge deletion to match the characteristics of the candidate pattern and moves on without wasting computational resources or producing sampling artifacts.

In FIG. 5, a block diagram and flow chart of the sorting function, called Smart Search, utilized in FMLT capability 10 is shown, according to the present disclosure. Once the "Unordered Fingerprint Comparison" has been computed, the next task in FMLT capability 10 is to apply a sorting function that determines which of the fingerprinted regions in the target space is most similar to the fingerprint of the candidate pattern. There are many ways to define what 'most similar' means (an ongoing subject of much debate). Future work will focus on allowing differing paradigms with respect to the importance of various aspects of comparison (e.g., to account for different use cases or different client tolerances, or as a method of addressing decision elasticity).

In step 5.4, each fingerprint contains measures relating to the graph, the aggregate vertex properties of the meso-scale vertices and the aggregate edge properties of the meso-scale edges. In step 5.5, Graph, Vertex and Edge properties can be assigned differing proportional weight. The default weights are determined according to Smart Search, which was designed to infer which graph properties are most important based on the morphology of the candidate pattern. Further, in step 5.6, dimensions are selected for inclusion in the fingerprint embedding because they prove effective at separating graph characteristics when used as a set.

A classifier is trained to use the optimal weights of these fingerprint graph variables to classify graphs into known classes, where the classes for each graph are determined by how each graph is created ("Complete," "Trade," "Scale-Free," "Defoliated Trade," "Tree-like," etc.) in step 5.7. Further, this classifier is applied to the candidate pattern, and the resulting probabilities are used as weights and combined with known importance characteristics of the graph properties for each graph class. The result is a weighted average of variable importance across the predicted graph classes for the candidate pattern. These values are taken as the default weights for FMLT capability 10 distance calculation.

When searching for meso-scale regions that are similar to a candidate pattern within a large graph space, GuidedWalks only optimizes approximately half of FMLT capability task. After appropriate local graph patterns have been produced, the next task is to sort them by how similar or dissimilar they are to the candidate pattern in step 5.8. This is done by transforming each local graph pattern into a local graph fingerprint which contains a variety of graph measures, as well as measurements about the meso-scale edge and vertex properties in step 5.9. Further, these measures are collected for all the local graph patterns generated (typically one for every starting vertex in a graph space). Using each measure's percentile ranking, transforms each raw measure into a percentile z-score. The "distance" between the pattern candidate and the local graph patterns is measured by calculating the distance between two vectors made of normalized z-scores (in other words, using standardized transforms of the measure for each embedding dimension) for some selection of graph, edge and vertex measures. Further, particular measures can be weighed in the comparison vector arbitrarily, forcing certain measures to be more or less impactful on the distance calculation in this z-score vector space. Thus, by using the sorting function "Smart Search," FMLT capability 10 produces output including a description of a candidate pattern, candidate pattern defoliation steps, target space aggregation specifics, similarity-ranked subgraph patterns discovered with associated subgraph fingerprints, and analytic support to justify similarity of said patterns and data relating to statistical discovery through any stochastic sampling method in step 6.0.

To optimize the smart sort, it is necessary for some measure of sorting efficacy. This can be difficult as, unlike GuidedWalks, there is no clear objective to compare outcomes against. This can be considered by maximizing the separation between fingerprints in the result, or the information entropy of the vectors—but there is no guarantee that these approaches will surface similarities and differences that really matter in a FMLT capability: namely, a key graph structure present in the candidate pattern.

Figure 6:
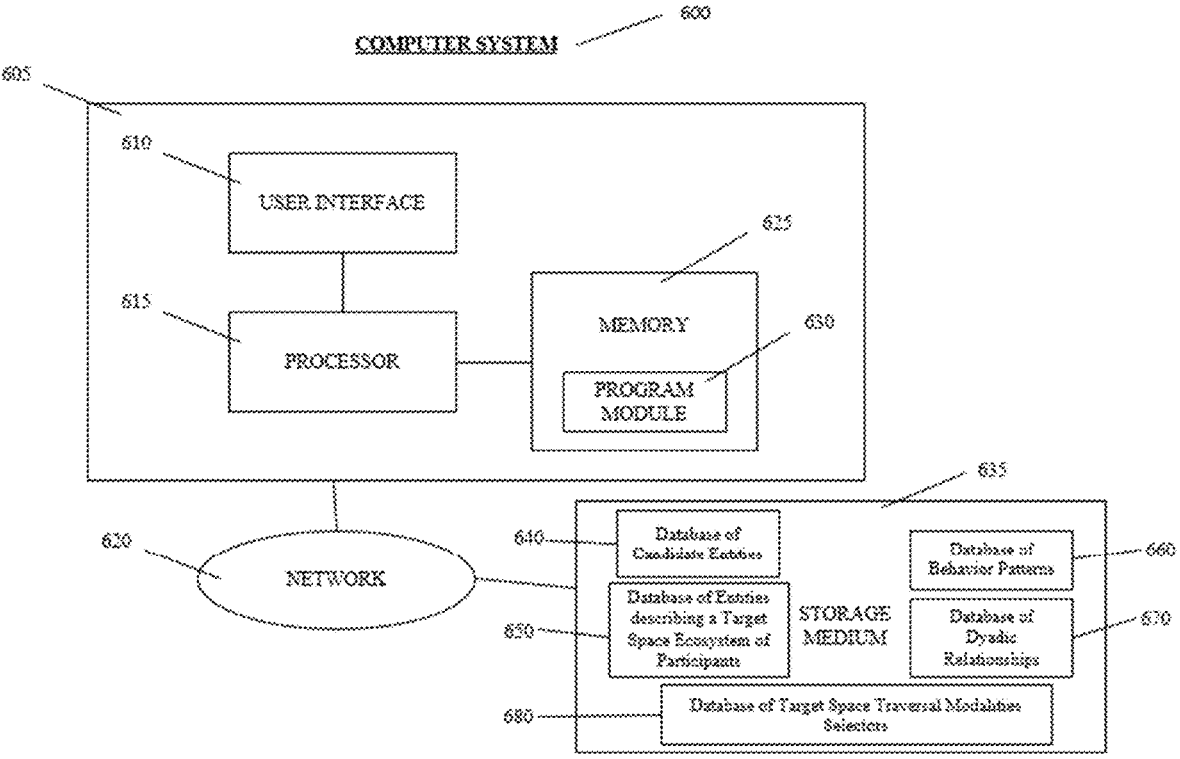
FIG. 6 is a block diagram of a computer system, for employment of the present disclosure.

In FIG. 6, a block diagram of a computer system 600 is shown, for implementation of a system in accordance with the present disclosure. Computer system 600 includes a computer 605 coupled to a network 620, e.g., the Internet.

Computer 605 includes a user interface 610, a processor 615, and a memory 625. Computer 605 may be implemented on a general-purpose microcomputer. Although computer 605 is represented herein as a standalone device, it is not limited to such, but instead can be coupled to other devices (not shown) via network 620.

Processor 615 is configured of logic circuitry that responds to and executes instructions in accordance with this disclosure. Processor 615 may be configured and programmed to control FMLT capability 10, a system and method for establishing a digital fingerprint of a pattern of behavior and then prosecuting any ecosystem (either the one in which that pattern was found or a completely disparate one) for isomorphic relationships that resemble that pattern of behavior in a meaningful and quantifiable way. Processor 615 controls all systems and methods, utilizing FMLT capability 10, including but not limited to RandomWalks, DirectedWalks, GuidedWalks, and the sorting function, Smart Search. Further, processor 615 may be configured and programmed to control FMLT capability 10, wherein the method also addresses concerns of bias including but not limited to random discovery, anecdotal similarity, and computational intractability.

Memory 625 stores data and instructions for controlling the operation of processor 615. Memory 625 may be implemented in a random-access memory (RAM), a hard drive, a read-only memory (ROM), a programmable read-only memory (PROM), or a combination thereof. One of the components of memory 625 is a program module 630.

Program module 630 contains instructions for controlling processor 615 to execute the methods described herein. For example, as a result of execution of program module 630, processor 615 establishes a digital fingerprint of a pattern of behavior by ingesting and defoliating a pattern of dyadic relationships, assigns a digital fingerprint which consists of pre-existing and bespoke measurements and characteristics, curates a target space including a dimension of time that is constructed according to canonical grammars, discovers patterns which bear resemblance isomorphically to the dyadic relationship, and synthesizes patterns which bear resemblance isomorphically to the dyadic relationship, and presents the patterns that have been discovered along with supporting statistical data to allow a group of trained experts to prosecute the discovered patterns.

The term "module" is used herein to denote a functional operation that may be embodied either as a stand-alone component or as an integrated configuration of a plurality of sub-ordinate components. Thus, program module 630 may be implemented as a single module or as a plurality of modules that operate in cooperation with one another. Moreover, although program module 630 is described herein as being installed in memory 625, and therefore being implemented in software, it could be implemented in any hardware (e.g., electronic circuitry), firmware, software, or a combination thereof.

User interface 610 includes an input device, such as a keyboard, biometrics or speech recognition subsystem, for enabling a user to communicate information and command selections to processor 615. User interface 610 also includes an output device such as a display or a printer. A cursor control such as a mouse, track-ball, or joy stick, allows the user to manipulate a cursor on the display for communicating additional information and command selections to processor 615.

Processor 615 outputs, to user interface 610, a result of an execution of the methods described herein. Alternatively, processor 615 could direct the output to a remote device (not shown) via network 620.

While program module 630 is indicated as already loaded into memory 625, it may be configured on a storage medium 635 for subsequent loading into memory 625. Storage medium 635 can be any conventional storage medium that stores program module 630 thereon in tangible form. Examples of storage medium 635 include a floppy disk, a compact disk, a magnetic tape, a read only memory, an optical storage media, a universal serial bus (USB) flash drive, a secure digital (SD) card, a digital versatile disc, or a zip drive. Alternatively, storage medium 635 can be a random-access memory, or other type of electronic storage, located on a remote storage system and coupled to computer 605 via network 620. Storage medium 635 can include a plurality of databases, accessible by processor 615, coupled to computer 605 via network 620, including at least a database of candidate entities 640, a database of entities describing a target space ecosystem of participants 650, a database of behavior patterns 660, a database of dyadic relationships 670, and a database of target space traversal modalities selectors 680.

In another embodiment, to understand the graph properties that are most likely to uncover structure, there may be a testing space that contains structure generated from known graph-generating algorithms and re-base every component of this space such that some vertices are from multiple known graph types. Further, for a set of candidate patterns for each type, optimal sorting measures and weights may be solved such that like-labeled types are correctly sorted as closer to the candidate in normalized z-space. In other words, the distance measure is "trained" for the fingerprint space "on" a graph deliberately constructed of different "ideal type" and empirical dataset "regions," in which the distance measure can distinguish in the high-dimensional fingerprint embedding space.

In one example, FMLT capability 10 may find other groups of malefactors operating from the same "play book" as a discovered clique. In cases where a new form of malfeasance is discovered (e.g., a new way of money laundering) or a potentially highly effective greenfield strategy is discovered (e.g., Enron in the early days), this technique can help discover if there are as-yet-undetected others using the same methods.

Figure 7:
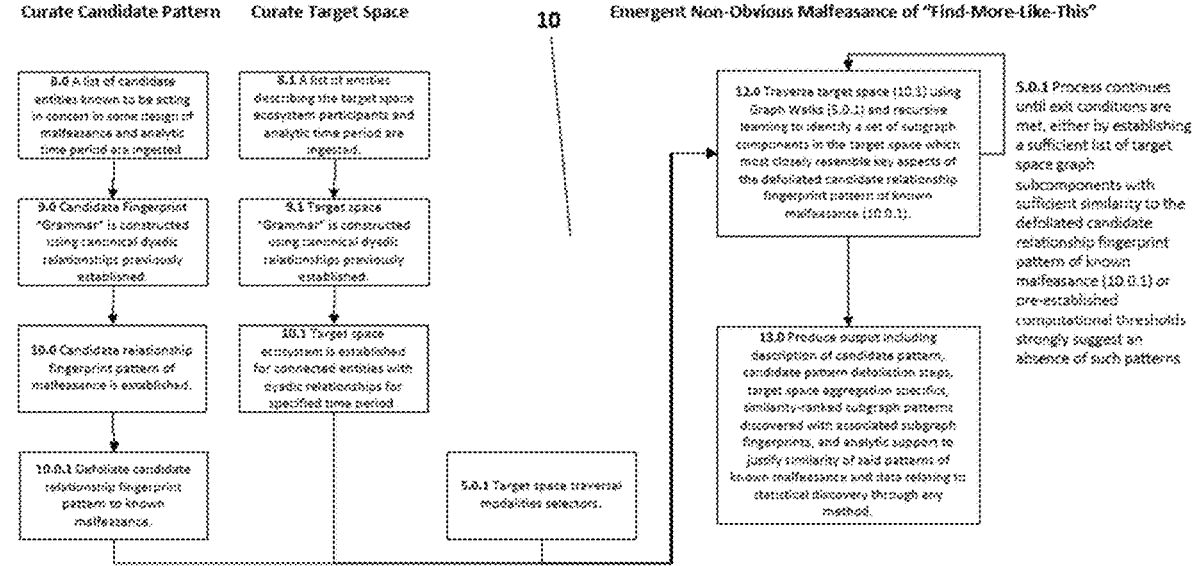
FIG. 7 is a block diagram and flow chart of an example of discovering malfeasance utilizing the FMLT capability according to the present disclosure.

In FIG. 7, a block diagram and flow chart of an example of discovering malfeasance utilizing the FMLT capability 10 is shown, according to the present disclosure. The "Find-More-Like-This" (FMLT) capability 10 begins curating a candidate pattern by ingesting a list of candidate entities and an analytic time period in step 8.0. After step 8.0 is completed, FMLT capability 10 constructs a candidate fingerprint "Grammar" using canonical dyadic relationships previously established in step 9.0. FMLT capability 10, then establishes a candidate relationship digital fingerprint in step 10.0. Further, FMLT capability 10 defoliates the candidate relationship digital fingerprint in step 10.0.1. As the curating of the candidate pattern begins, FMLT capability 10 is simultaneously curating a target space by ingesting a list of entities describing the target space ecosystem participants and an analytic time period in step 8.1. After step 8.1 is completed, FMLT capability 10 constructs a target space "Grammar" using canonical dyadic relationships previously established in step 9.1. FMLT capability 10, then establishes a target space ecosystem for a specified time period in step 10.1. After completing, curating a candidate pattern in step 10.0.1 and curating a target space in step 10.1, FMLT capability 10 utilizes target space traversal modalities selectors, called Graph Walks, in step 5.0.1. Further, in step 12.0, FMLT capability 10 traverses target space in step 10.1, using Graph Walks in step 5.0.1 and recursive learning to identify a set of subgraph components in the target space which most closely resemble key aspects of the defoliate candidate relationship digital fingerprint curated in step 10.0.1. In step 5.0.1, the process continues until exit conditions are met, either by establishing a sufficient list of target space graph subcomponents with sufficient similarity to the defoliated candidate relationship digital fingerprint curated in step 10.0.1, or pre-established computational thresholds strongly suggest an absence of such patterns. Thus, FMLT capability 10 then uses a sorting function, which produces output including a description of a candidate pattern, candidate pattern defoliation steps, target space aggregation specifics, similarity-ranked subgraph patterns discovered with associated subgraph fingerprints, and analytic support to justify similarity of said patterns and data relating to statistical discovery through any stochastic sampling method in step 13.0.

Example of Emergent Non-Obvious Malfeasance:

While there are many applications of this method, one compelling example involves finding disparate groups of malefactors operating from a similar playbook or pattern of behavior.

Scenario: Given a clique of known interest, investigate the same space in which that clique was known to have been operating or any other area of interest (specified by geography, industry, or other contextualization) in order to discover others who may be operating from the same playbook before they change their pattern of behavior.

One of the biggest challenges to discovering groups of individuals operating in some novel way, particularly when malfeasance is involved, is the observer effect. Prior art focuses on cataloging sources and methods of malefactors so that others doing the same thing can be found. Given sufficient amounts of data and time for analysis, it is possible to detect some popular forms of behavior and to intervene. However, there is an inherent dichotomy because the most skillful malefactors, when they suspect they are being observed, will rapidly change their behavior to some new method (this is the observer effect). In other words, methods of discovery based purely on supervised learning will discover how the most skillful "bad guys" are no longer behaving.

FMLT provides a way of discovering malefactors operating in cliques before they have an opportunity to change their behavior. Normally, in order to do this, the complexity of the environment and the need for massive amounts of experiential data, make such a discovery impossible.

Curating a candidate pattern involves starting with a list of entities known to be acting in concert in some design of malfeasance (8.0). Using a set of curating steps based on known dyadic relationships (9.0), a candidate pattern is established representing either the way the clique was behaving during some particular period in time, or summarizing the entirety of behavior over a longer period of time. The nodes (entities) and edges (dyadic relationships) of this analysis produce a relationship (fingerprint) pattern (10.0).

Normally patterns created in this way will be extremely complex, containing a significant amount of artifact related to behaviors that are not likely to be relevant to the underlying behavior of malfeasance. Defoliation steps are applied to reduce the complexity of the Candidate pattern to the essence of the relationship that is consistent with the type of known malfeasance (10.0.1) (i.e., Emergent Non-Obvious Malfeasance, e.g., Fraud, Identity Theft, Cyber Crime, etc.)

In parallel to the steps above, it is necessary to create a target space within which to look for other cliques operating with the same pattern of behavior. It is not necessary that this target space contain the original environment where the malefactors were operating. Thus, for example, imagine a group of fraudsters were discovered operating with a certain pattern of behavior in North America. The target space to look for others could be Western Europe. This aspect of allowing the target space to be freely constructed is one of the powerful aspects of this approach. Further, the curating of a target space of an original pattern of a first environment can be indicative of adverse consequences and is utilized in discovering a fingerprint pattern which can be indicative of adverse consequences of a second environment. Therefore, the first environment indicative of adverse consequences and the second environment indicative of adverse consequences may comprise at least one of a town, city, state, province and/or country.

To construct the target space, a list of entities (8.1) from the target area of interest is connected using either the same or a different curation approach, analogous to what was done in 9.0, but yielding a target space of connected entities with dyadic relationships (9.1/10.1).

At this point, the target space is prosecuted according to the steps outlined in the invention above, further utilizing the target space traversal modalities selectors and/or Graph Walks (5.0.1, i.e., FIGS. 1-5). The process continues recursively until exit conditions are met. These exit conditions can include a sufficient list of similar subcomponents or pre-established computational thresholds which might suggest that there is nothing further to find.

In the example cited above, step 12.0 may discover 10 to 15 cliques which have a parent's similarity in behavior to the original pattern of behavior operating within the target space curated. A report, 13.0, outlines why these patterns were considered similar, and how similar they are according to various statistical measures which include not only how similar the pattern is, but how likely that pattern would be to occur at random within the space specified. In other words, sufficient evidence is given to human investigators to determine whether or not to pursue the various cliques identified.

FIG. 8 illustrates a typical digital fingerprint characteristic of malfeasance. Specifically, a digital fingerprint 800 may be a subgraph behavior depicting a discovered malfeasance pattern (e.g., a single node connecting a clique of otherwise disconnected entities which exhibits some impact on the remaining clique in the connected component). As shown in FIG. 8, the digital "fingerprint" of the relationship may comprise a set of derived characteristics 802*a*, 802*b*, 802*c*, 802*d*, . . . 802*n* relating to the morphology, size, complexity, or other classification of the subgraph.

Using this method, not only is a process which would otherwise be computationally overwhelming made tractable, but it is made tractable in a way that allows intervention before the parties involved can change their behavior and become subsequently undiscoverable.

It is important that a set of dyadic relationships can be curated which are sufficiently descriptive of the candidate pattern and the target ecosystem. However, missingness or adversarial manipulation of the data would be antithetical to the outcome.

The broadest operable range is an entire commercial ecosystem—e.g., all of a company's enterprise counterparties and their counterparties, taken to the maximum discoverable recursion. For example, all work may be done in "Mathematica," or similar analysis platforms, in the context of bespoke system notebooks.

The techniques described herein are exemplary and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The term "canonical" is to be interpreted as specifying the presence of stated features as being elemental and/or foundational to the system and/or method, essential.

The term "grammar" or "grammars" is to be interpreted as specifying the presence of stated features as allowing a user to transform a program, which is normally represented as a linear sequence of ASCII characters, into a syntax tree. Only programs that are syntactically valid can be transformed in this way. This tree will be the principal data-structure that a compiler or interpreter uses to process the program. By traversing this tree, the compiler can produce machine code, or can type check the program, for instance. By traversing this very tree, the interpreter can simulate the execution of the program.

The term "dyadic" is to be interpreted as specifying the presence of stated features as relating to a dyadic relationship, which describes the relationship between two people or entities. In a dyadic relationship, the two people or entities must have known each other for a length of time and had many interactions.

The terms "comprises" or "comprising" are to be interpreted as specifying the presence of the stated features, integers, steps or components, but not precluding the presence of one or more other features, integers, steps or components or groups thereof.

What is claimed is:

1. A system that characterizes and detects specific relationship patterns and scans large relationship graphs seeking similar patterns of behaviors, said system comprises:

a computer processor;

a memory for storing a set of instructions for the computer processor;

a plurality of databases, accessible by said processor, including at least a database of behavior patterns, a database of candidate entities, a database of target space entities describing a target space ecosystem of participants, a database of target space traversal modalities selectors, and a database of dyadic relationships, wherein the set of instructions in the memory cause the computer processor to perform steps of:

a. collecting a subset list of candidate entities from said database of candidate entities, wherein said database of candidate entities are known to exhibit a pattern of behavior;

b. constructing a digital fingerprint grammar of a candidate pattern of behavior from said subset list of candidate entities using canonical dyadic relationships for establishing a candidate relationship digital fingerprint;

c. defoliating said candidate relationship digital fingerprint to generate a defoliated candidate relationship digital fingerprint;

d. collecting a subset list of target space entities describing a target space ecosystem from said database of target space entities describing a target space ecosystem of participants, wherein said database of target space entities are known to exhibit said pattern of behavior;

e. constructing a target space grammar using said canonical dyadic relationships;

f. constructing a target space from said target space grammar for a period of time; and g. utilizing said defoliated candidate relationship digital fingerprint within said target space during said period of time, to discover entities exhibiting similar patterns of behaviors from navigating said target space.

2. The system of claim 1, wherein said system further comprises the steps of:

i. selecting a target space traversal modality selector from said database of target space traversal modalities selectors to utilize said defoliated candidate relationship digital fingerprint to navigate said target space for a known pattern of behavior;

ii. traversing said target space by using said target space traversal modality selector for said period of time to navigate said target space for said known pattern of behavior;

iii. recursively processing said step (ii) until exit condition (s) are met, thereby identifying a set of subgraph components in said target space which most closely resemble key aspects of said defoliated candidate relationship digital fingerprint; and iv. producing an output data of entities exhibiting similar patterns of behaviors from navigating said target space, which most closely resemble important attributes of said defoliated candidate relationship digital fingerprint from step (iii).

3. The system of claim 2, wherein said producing said output data of entities exhibiting similar patterns of behaviors comprises at least one item selected from the group consisting of:

i. description of said candidate pattern of behavior, ii. candidate pattern of defoliation step(s), iii. target space aggregation specifics, iv. similarity-ranked subgraph patterns discovered with associated subgraph digital fingerprints, and v. analytic support to justify similarity of said similarity-ranked subgraph patterns discovered with said associated subgraph digital fingerprints and data relating to statistical discovery through any method.

4. The system of claim 2, wherein said producing said output data of entities exhibiting similar patterns of behaviors occurs before, preparation of a known behavior and said entities exhibiting similar patterns of behaviors become aware of discovery.

5. The system of claim 1, further comprising:

presenting digital fingerprint patterns of said canonical dyadic relationships that have been discovered along with supporting statistical data to prosecute said discovered digital fingerprint patterns.

6. The system of claim 5, wherein said discovering of said digital fingerprint patterns of said canonical dyadic relationships comprises target space modalities selectors as defined by graph walks.

7. The system of claim 6, wherein said graph walks are at least one selected from the group consisting of: RandomWalks, DirectedWalks, and GuidedWalks.

8. The system of claim 5, wherein said discovering of said digital fingerprint patterns of said canonical dyadic relationships continues until exit conditions are met, either by establishing a sufficient list of target space graph subcomponents with sufficient similarity to said defoliated candidate relationship digital fingerprint or pre-established computational thresholds strongly suggest an absence of said digital fingerprint patterns.

9. The method of claim 5, wherein said presenting of said digital fingerprint patterns of said dyadic relationships discovers business patterns indicative of adverse consequences including at least one selected from the group consisting of money laundering, fraud, and malfeasance.

10. The system of claim 1, wherein the processor generates a multi-dimensional vector space embedding of numerous graph measures to characterize a local subgraph and to provide a "distance measure" of local graph similarity, used to scan a wider network for closest approximations to said discovered digital fingerprint patterns of said canonical dyadic relationships.

11. The system of claim 1, further comprising filtering bias resulting from at least one selected from the group consisting of random discovery, anecdotal similarity, and computational intractability.

12. The method of claim 1, further comprising curating the target space of an original pattern of a first environment, which is indicative of adverse consequences and is utilized in discovering a fingerprint pattern, which is indicative of adverse consequences of a second environment.

13. The method of claim 12, wherein said first environment indicative of adverse consequences and said second environment indicative of adverse consequences comprise at least one selected from the group consisting of: a town, city, state, province and country.

14. The method of claim 12, further comprising:

identifying a set of subgraph components in the target space which most closely resemble key aspects of an original pattern indicative of known malfeasance.

15. A method for characterizing and detecting specific relationship patterns and scanning large relationship graphs seeking similar patterns of behaviors, said method comprising:

a. collecting a subset list of candidate entities from a database of candidate entities, wherein said database of candidate entities are known to exhibit a pattern of behavior;

b. constructing a digital fingerprint grammar of a candidate pattern of behavior from said subset list of candidate entities using canonical dyadic relationships for establishing a candidate relationship digital fingerprint;

c. defoliating said candidate relationship digital fingerprint to generate a defoliated candidate relationship digital fingerprint;

d. collecting a subset list of target space entities describing a target space ecosystem from a database of target space entities describing a target space ecosystem of participants, wherein said database of target space entities are known to exhibit said pattern of behavior;

e. constructing a target space grammar using said canonical dyadic relationships;

f. constructing a target space from said target space grammar for a period of time;

g. utilizing said defoliated candidate relationship digital fingerprint within said target space during said period of time, wherein said method further comprises the steps of:

i. selecting a target space traversal modality selector from a database of target space traversal modalities selectors to utilize said defoliated candidate relationship digital fingerprint to navigate said target space for a known pattern of behavior;

ii. traversing said target space by using said target space traversal modality selector for said period of time to navigate said target space for said known pattern of behavior;

iii. recursively processing said step (ii) until exit condition(s) are met, thereby identifying a set of subgraph components in said target space which most closely resemble key aspects of said defoliated candidate relationship digital fingerprint; and iv. producing an output data of entities exhibiting similar patterns of behaviors from navigating said target space, which most closely resemble important attributes of said defoliated candidate relationship digital fingerprint from step (iii).

16. The method of claim 15, wherein said producing said output data of entities exhibiting similar patterns of behaviors comprises at least one item selected from the group consisting of:

i. description of said candidate pattern of behavior,
ii. candidate pattern of defoliation step(s),
iii. target space aggregation specifics,
iv. similarity-ranked subgraph patterns discovered with associated subgraph digital fingerprints, and
v. analytic support to justify similarity of said similarity-ranked subgraph patterns discovered with said associated subgraph digital fingerprints and data relating to statistical discovery through any method.

17. The method of claim 15, further comprising:
presenting digital fingerprint patterns of said canonical dyadic relationships that have been discovered along with supporting statistical data to prosecute said discovered digital fingerprint patterns.

18. The method of claim 17, wherein said discovering of said digital fingerprint patterns of said canonical dyadic relationships comprises target space modalities selectors as defined by graph walks.

19. The method of claim 18, wherein said graph walks are at least one selected from the group consisting of: RandomWalks, DirectedWalks, and GuidedWalks.

20. The method of claim 17, wherein said discovering of said digital fingerprint patterns of said canonical dyadic relationships continues until exit conditions are met, either by establishing a sufficient list of target space graph subcomponents with sufficient similarity to said defoliated candidate relationship digital fingerprint or pre-established computational thresholds strongly suggest an absence of said digital fingerprint patterns.

21. The method of claim 17, wherein said presenting of said digital fingerprint patterns of said dyadic relationships discovers business patterns indicative of adverse consequences including at least one selected from the group consisting of money laundering, fraud, and malfeasance.

22. The method of claim 15, wherein the processor generates a multi-dimensional vector space embedding of numerous graph measures to characterize a local subgraph and to provide a "distance measure" of local graph similarity, used to scan a wider network for closest approximations to said discovered digital fingerprint patterns of said canonical dyadic relationships.

23. The method of claim 15, further comprising filtering bias resulting from at least one selected from the group consisting of random discovery, anecdotal similarity, and computational intractability.

24. The method of claim 15, further comprising curating the target space of an original pattern of a first environment, which is indicative of adverse consequences and is utilized in discovering a fingerprint pattern, which is indicative of adverse consequences of a second environment.

25. The method of claim 24, wherein said first environment indicative of adverse consequences and said second environment indicative of adverse consequences comprise at least one selected from the group consisting of: a town, city, state, province and country.

26. The method of claim 24, further comprising:
identifying a set of subgraph components in the target space which most closely resemble key aspects of an original pattern indicative of known malfeasance.

27. The method of claim 15, wherein said producing said output data of entities exhibiting similar patterns of behaviors occurs before, preparation of a known behavior and said entities exhibiting similar patterns of behaviors become aware of discovery.

* * * * *